United States Patent
Kuroda

(10) Patent No.: US 7,884,524 B2
(45) Date of Patent: Feb. 8, 2011

(54) BRUSHLESS ALTERNATOR

(75) Inventor: Motokazu Kuroda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/579,768

(22) Filed: Oct. 15, 2009

(65) Prior Publication Data

US 2011/0001376 A1    Jan. 6, 2011

(30) Foreign Application Priority Data

Jul. 3, 2009    (JP) .............................. 2009-158416

(51) Int. Cl.
*H02K 29/00* (2006.01)
(52) U.S. Cl. ...................... 310/263; 310/194
(58) Field of Classification Search ................. 310/263, 310/194
See application file for complete search history.

(56) References Cited

U.S. PATENT DOCUMENTS 6,967,423 B2 * 11/2005 Kuroda et al. ............... 310/194
7,514,837 B2 * 4/2009 Kuroda et al. ............... 310/263
7,759,838 B2 * 7/2010 Bradfield et al. ............. 310/263

FOREIGN PATENT DOCUMENTS

JP    2-133053 A    5/1990

* cited by examiner

*Primary Examiner*—Dang D Le
(74) *Attorney, Agent, or Firm*—Sughrue Mion, PLLC

(57) ABSTRACT

Provided is a brushless alternator for preventing water from penetrating further inside through a gap between a distal end portion of a spool and a concave portion of a bracket. According to the brushless alternator of the present invention, a rotor includes: a rotor main body; and a coil body (30) fixed to a rear bracket (21). The coil body (30) includes: a bobbin (32); a field coil (13); a yoke portion (10) of a second magnetic pole, the yoke portion (10) having one lateral surface being in close contact with a lateral surface of the bobbin (32) and another lateral surface being bonded to the rear bracket (21); a spool (31) provided on an inner circumferential surface of the yoke portion (10) and an inner circumferential surface of the bobbin (32); and a rubber bush (101) provided to a projecting portion (312) at a distal end of the spool (31). The rubber bush (101) is fitted into a concave portion (21a) formed at a portion of the rear bracket (21), the portion being opposed to a distal end surface of the spool (31).

6 Claims, 3 Drawing Sheets

BRUSHLESS ALTERNATOR

BACKGROUND OF THE INVENTION

1. Field of the Invention

The present invention relates to a brushless alternator which is mounted, for example, in a vehicle.

2. Description of the Related Art

A brushless alternator including a shaft, a rotor, and a stator is conventionally known (for example, see JP 02-133053 A (FIG. 6)). In the conventional brushless alternator, the shaft is rotatably provided in a case constituted by a pair of brackets through an intermediation of a bearing on a central axis of the case. The rotor is fixed to the shaft, and has N-poles and S-poles formed alternately along a direction of rotation. The stator surrounds the rotor. The rotor includes a field coil and a pair of pole cores. A current is made to flow through the field coil to generate a magnetic flux. Each of the pair of pole cores includes a plurality of claw-like magnetic pole portions and a yoke portion. The pair of pole cores cover the field coil to be respectively magnetized to the N-pole and the S-pole by the magnetic flux.

In the case of the brushless alternator described above, the field coil obtained by winding a conductor around a spool is fixed to one of the brackets through an intermediation of the yoke portion of one of the pole cores. A distal end portion of the spool is fitted into a concave portion of the one of the brackets.

In the conventional brushless alternator, the distal end portion of the spool is simply fitted into the concave portion of the one of the brackets. In addition, the field coil and the yoke portion are fixed to the one of the brackets substantially only by mounting bolts. Therefore, a gap is locally generated between the yoke portion and the bracket due to fine surface roughness of surfaces of the one of the brackets and the yoke portion, which are brought into contact with each other, and a difference in flatness between the surfaces.

With the generation of the gap, water penetrates into the gap from exterior. Subsequently, the water passes through a gap between the distal end portion of the spool and the concave portion of the bracket to reach the bearing. As a result, there is a problem that the bearing is degraded to generate abnormal sounds or the bearing is damaged by the generation of rust.

Moreover, the generation of the gap between the surface of the yoke portion and the surface of the bracket, which are brought into contact with each other, inclines the mounting portions of the yoke portions and the field coil with respect to the bracket to cause a malfunction in a magnetic circuit of the pole cores. Moreover, the spool abuts against the pole cores. Thus, there is another problem that the operation of the rotor is destabilized.

SUMMARY OF THE INVENTION

The present invention aims to solve the problems described above, and has an object of providing a brushless alternator for preventing water having penetrated between surfaces of a yoke portion and a bracket, which are brought into contact with each other, from subsequently penetrating further inside through a gap between a distal end portion of a spool and a concave portion of the bracket.

The present invention has another object of providing the brushless alternator with reduced operational instability of a rotor due to a malfunction of a magnetic circuit of pole cores, which is caused by inclination of mounting positions of the yoke portions and a field coil with respect to the bracket, and abutment of the spool against the pole cores.

The brushless alternator according to the present invention includes: a case including a pair of brackets opposed to each other; a shaft provided on a central axis of the case; a rotor provided to the shaft; and a stator surrounding the rotor, in which the rotor includes: a rotor main body fixed to the shaft to rotate with rotation of the shaft; and a coil body fixed to one of the pair of brackets, the rotor main body includes: a first pole core, which is fixed to the shaft, and includes a plurality of first claw-like magnetic pole portions formed at intervals in a circumferential direction; and a plurality of second claw-like magnetic pole portions respectively opposed to the plurality of first claw-like magnetic pole portions to mesh therewith, the plurality of second claw-like magnetic pole portions being coupled to the plurality of first claw-like magnetic pole portions neighboring through an intermediation of an annular ring, the coil body includes: an insulator provided in a space on an inner diameter side of the plurality of first claw-like magnetic pole portions and the plurality of second claw-like magnetic pole portions of a second pole core opposed to the first pole core; a field coil constituted by winding a conductor around the insulator, the field coil being for generating a magnetic flux by causing a current to flow therethrough; a yoke portion of the second magnetic pole, the yoke portion having one lateral surface being in close contact with a lateral surface of the insulator and another lateral surface being bonded to the one of the pair of brackets to serve as a passage of the magnetic flux; a spool provided on an inner circumferential surface of the yoke portion and an inner circumferential surface of the insulator; and a buffer member provided to a projecting portion at a distal end of the spool, and the buffer member is fitted into a concave portion formed in a portion of the one of the pair of brackets, the portion being opposed to a distal end surface of the spool.

According to the brushless alternator of the present invention, the buffer member is provided to the projecting portion at the distal end of the spool. The buffer member is fitted into the concave portion formed in a portion of the bracket, which is opposed to the distal end surface of the spool. Therefore, it is possible to prevent water, which has penetrated between the surface of the yoke portion and the surface of the bracket, the surfaces being brought into contact with each other, from subsequently penetrating further inside through a gap between the distal end portion of the spool and the concave portion of the bracket.

Moreover, it is possible to reduce operational instability of the rotor due to the malfunction of the magnetic circuit of the pole cores, which is caused by the inclination of the mounting positions of the yoke portions and the field coil with respect to the bracket, and the abutment of the spool against the pole cores.

DETAILED DESCRIPTION OF THE PREFERRED EMBODIMENTS

First Embodiment

Hereinafter, a brushless alternator according to a first embodiment of the present invention is described with reference to the accompanying drawings.

Figure 1:
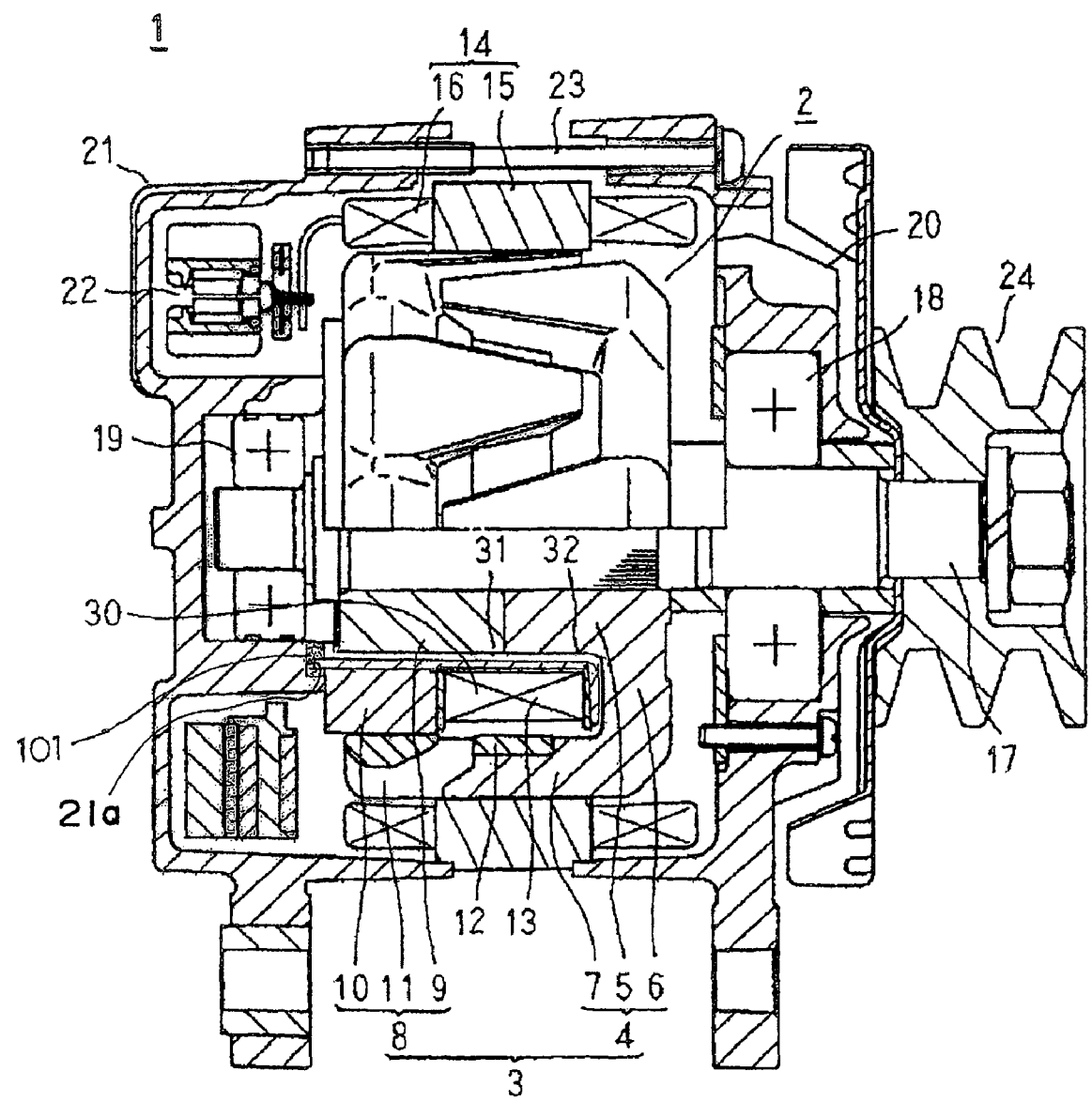
FIG. 1 is a side sectional view illustrating a brushless alternator according to a first embodiment of the present invention.
Figure 2:
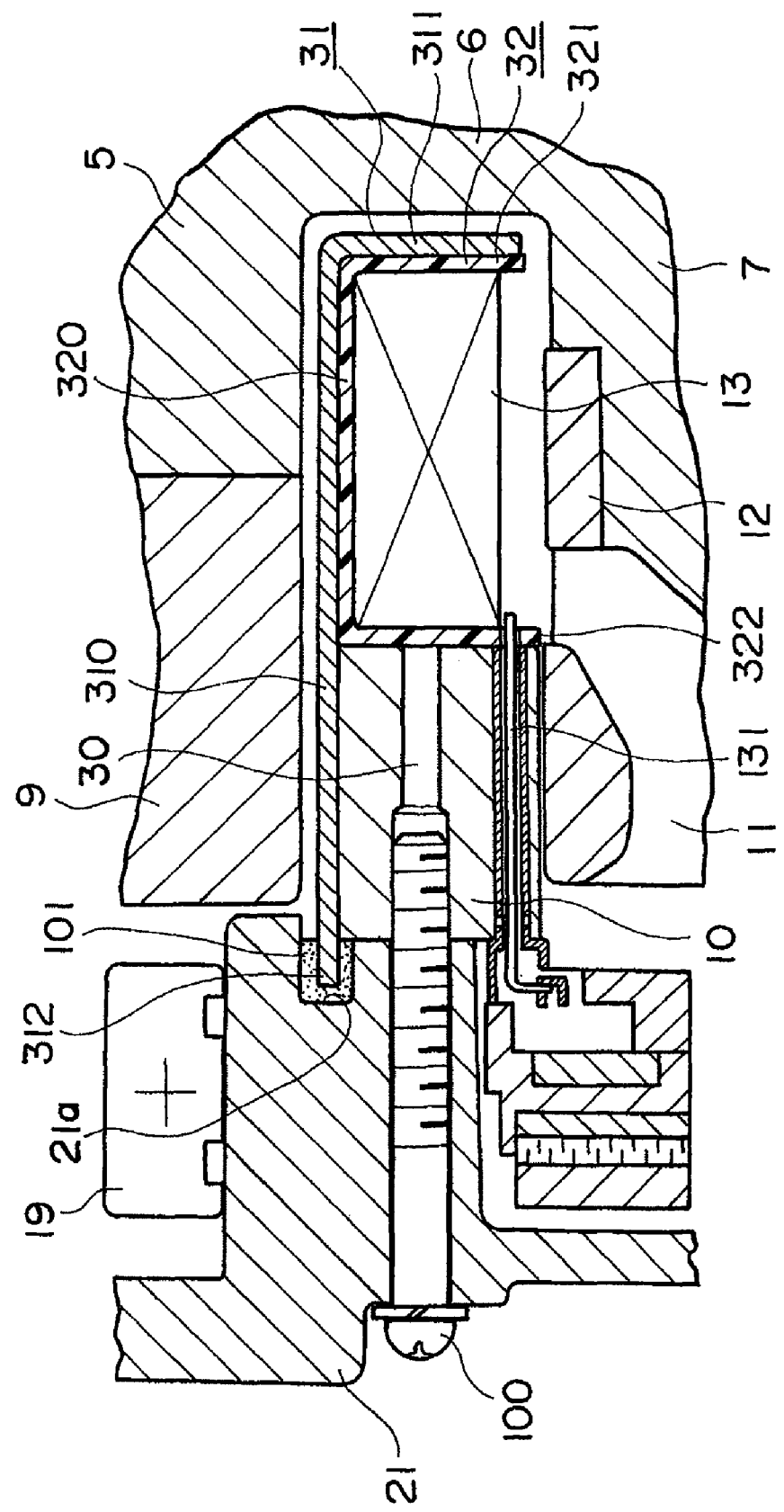
FIG. 2 is an enlarged sectional view of a principal part of the brushless alternator illustrated in FIG. 1.
Figure 3:
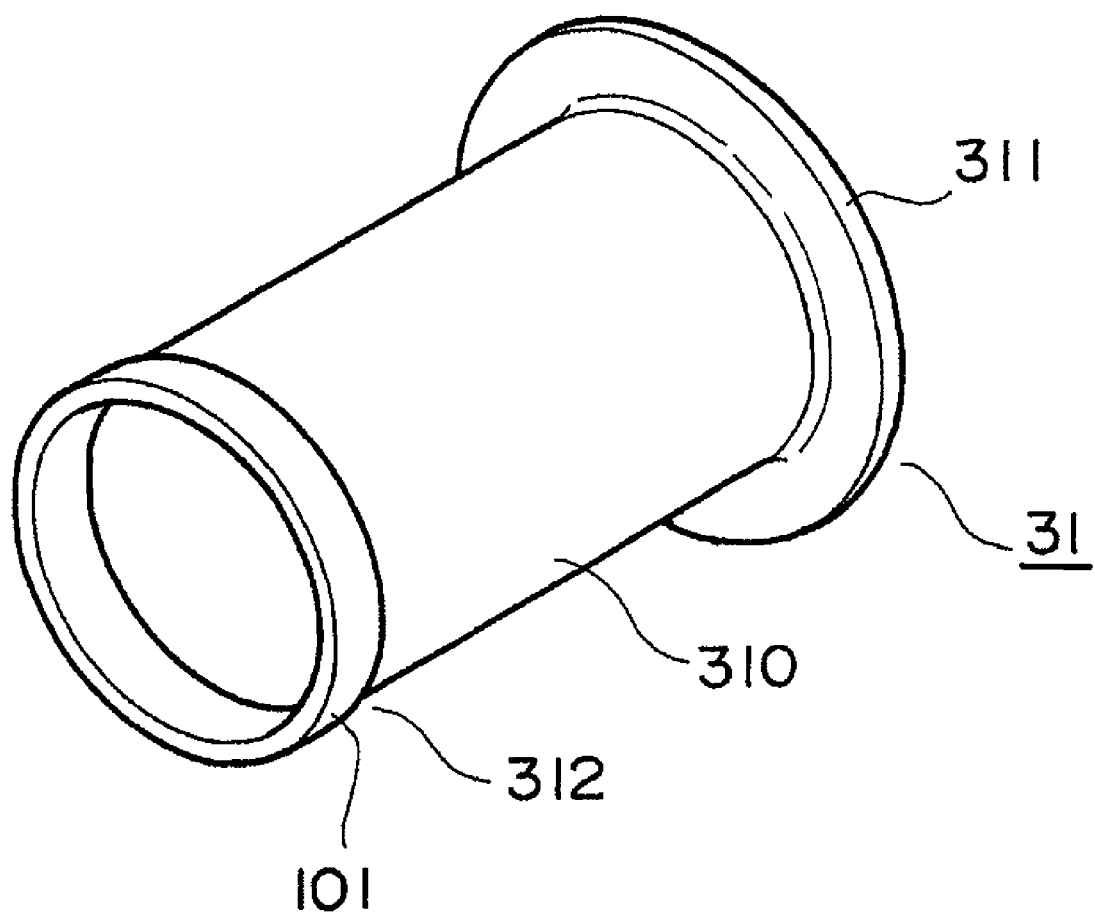
FIG. 3 is a perspective view of a spool illustrated in FIG. 1.

FIG. 1 is a side sectional view illustrating a brushless alternator 1 of the present invention, FIG. 2 is an enlarged view of a principal part of FIG. 1, and FIG. 3 is an overall perspective view of a spool 31 illustrated in FIG. 1.

The brushless alternator 1 includes a case, a stator 14, a shaft 17, a rotor 2, a rectifier 22, and a regulator (not shown). The case is formed by integrating a front bracket 20 and a rear bracket 21 by using a through bolt 23. The stator 14 is fixed to the case. Both ends of the shaft 17 are rotatably supported respectively by a front bearing 18 mounted to the front bracket 20 and a rear bearing 19 mounted to the rear bracket 21. The rotor 2 is provided on the inside of the stator 14 to be fixed to the shaft 17. The rectifier 22 is electrically connected to the stator 14 to convert an AC output into a DC output. The regulator is electrically connected to the rotor 2 to control the AC voltage generated by the stator 14 to be within a predetermined range.

The front bracket 20 side of the shaft 17 extends to the outside. A pulley 24 is fixed to the extending portion of the shaft 17. A belt (not shown) is looped around the pulley 24 and an engine (not shown). With such a structure, the shaft 17 is rotated by driving the engine through an intermediation of the belt.

The rotor 2 includes a pole core 3 and a field coil 13 provided on the inside of the pole core 3.

The pole core 3 includes a front pole core 4 corresponding to a first pole core and a rear pole core 8 corresponding to a second pole core.

The front pole core 4 includes a first boss portion 5 having a cylindrical shape, a first yoke portion 6, and a plurality of first claw-like magnetic pole portions 7. The shaft 17 passes through the first boss portion 5 at its axial position to be fixed thereto. The first yoke portion 6 has a ring-like shape with a large thickness, and is provided to extend radially outward from one end of the first boss portion 5. Each of the first claw-like magnetic pole portions 7 has a distal end portion extending from an outer circumferential portion of the first yoke portion 6 along an axial direction toward the inside of the case.

The rear pole core 8 includes a second boss portion 9 having a cylindrical shape, a second yoke portion 10, and a plurality of second claw-like magnetic pole portions 11. The shaft 17 passes through the second boss portion 9 at its axial position to be fixed thereto. The second yoke portion 10, which has a ring-like shape with a large thickness, is located radially outside of the second boss portion 9 with a distance therefrom. Each of the second claw-like magnetic pole portions 11 is located radially outside of the second yoke portion 10 with a distance therefrom and has a distal end portion extending along the axial direction toward the inside of the case.

An inner end surface of the second boss portion 9 and that of the first boss portion 5 are in surface contact with each other.

The second claw-like magnetic pole portions 11 and the first claw-like magnetic pole portions 7 are located to cause their distal end portions to mesh with each other. An inner circumferential surface of each of the first claw-like magnetic pole portions 7 and that of each of the second claw-like magnetic pole portions 11 are bonded to an outer circumferential surface of an annular ring 12 made of a non-magnetic material over the entire circumference by welding or brazing. The second claw-like magnetic pole portions 11 and the first claw-like magnetic pole portions 7 are coupled to each other through an intermediation of the ring 12.

The field coil 13 is provided in a space formed between the first claw-like magnetic pole portions 7 and the second claw-like magnetic pole portions 11 opposed to the first claw-like magnetic pole portions 7.

The field coil 13 includes a bobbin 32 made of a resin, which corresponds to an insulator having the shaft 17 as a central axis, and a conductor wound around the bobbin 32. A leader line 131 corresponding to an end portion of the conductor wound around the bobbin 32 a plurality of times is connected to the regulator. The bobbin 32 includes a cylindrical portion 320 and a pair of flange portions 321 and 322 extending radially outward from both ends of the cylindrical portion 320.

The spool 31 is in close contact with the cylindrical portion 320 and the flange portion 321 of the bobbin 32.

The spool 31 includes a cylindrical portion 310, a flange portion 311, and a projecting portion 312. The cylindrical portion 310 is fabricated by press-molding a mild steel sheet, and is in close contact with each of an inner circumferential surface of the cylindrical portion 320 and an inner circumferential surface of the second yoke portion 10. The flange portion 311 extends radially outward from one end portion of the cylindrical portion 310 to be in close contact with the flange portion 321. The projecting portion 312 is provided to extend from the cylindrical portion 310 to project toward the rear bracket 21 side. The spool 31 is integrated with the second yoke portion 10 and the bobbin 32 by spot-welding a portion of the cylindrical portion 310, which overlaps the second yoke portion 10, for example, at four equiangular positions.

A rubber bush 101 corresponding to a buffer member is fixed to the projecting portion 312 over its entire circumference. The rubber bush 101 is fitted into a concave portion 21a formed in the rear bracket 21 in a sealed state.

The second yoke portion 10 is fixed to the rear bracket 21 by using mounting bolts 100 at three equiangular positions.

The second yoke portion 10 fixed to the rear bracket 21, the spool 31 bonded to the second yoke portion 10 by welding, the bobbin 32, and the field coil 13 constitute a coil body 30.

The second boss portion 9 and the second claw-like magnetic pole portions 11 of the rear pole core 8, and the front pole core 4 constitute a rotor main body which rotates with the shaft 17.

Next, a procedure of fixing the thus constituted coil body 30 to the rear bracket 21 is described.

First, the bobbin 32 is inserted into the cylindrical portion 310 of the spool 31. Subsequently, the second yoke portion 10 is inserted into the cylindrical portion 310 of the spool 31. Next, the second yoke portion 10 and the spool 31 are bonded to each other by spot-welding. After that, the conductor is wound around the bobbin 32 to fabricate the field coil 13.

Next, the rubber bush 101 is adhered to the projecting portion 312 of the spool 31 over its entire circumference, thereby completing assembly of the coil body 30.

After the coil body 30 is assembled in the above-mentioned manner, the projecting portion 312 of the spool 31, to which the rubber bush 101 is adhered, is fitted into the concave portion 21a of the rear bracket 21 to be positioned.

Finally, the second yoke portion 10 is screwed to the rear bracket 21 by using the mounting bolts 100 in this state. As a result, the coil body 30 is fixed to the rear bracket 21.

In the brushless alternator 1 configured as described above, a current is supplied from a battery (not shown) to the field coil 13 of the coil body 30 fixed to the rear bracket 21 to generate a magnetic flux. By the magnetic flux, the first claw-like magnetic pole portions 7 are magnetized to have an N-pole, whereas the second claw-like magnetic pole portions 11 are magnetized to have an S-pole.

On the other hand, the pulley 24 is driven by the engine to rotate the shaft 17. As a result, the rotor main body of the rotor 2 is rotated to apply a rotating magnetic field to a stator core 15, thereby generating an electromotive force in a stator winding 16. The AC electromotive force is rectified into a DC electromotive force by the rectifier 22 to charge the battery.

In the brushless alternator 1 of the above-mentioned embodiment, a vibration of the engine, a rotation vibration of the brushless alternator 1 itself or the like is applied to the mounting bolts 100. Then, a gap is locally generated between the second yoke portion 10 and the rear bracket 21 due to fine surface roughness of a surface of the second yoke portion 10 and a surface of the rear bracket 21, which are brought into contact with each other, or a difference in flatness between the surfaces. Then, water penetrates through the gap.

According to the brushless alternator 1, however, the rubber bush 101 is provided to the projecting portion 312 at the distal end of the spool 31, and is then, fitted into the concave portion 21a of the rear bracket 21. Therefore, if the water penetrates into the gap between the second yoke portion 10 and the rear bracket 21 to subsequently penetrate inside through the concave portion 21a of the rear bracket 21, the further penetration of the water is inhibited by the rubber bush 101.

Therefore, the penetration of the water into the bearing 19 is inhibited, and hence inconvenience such as the generation of abnormal sounds due to the degradation of the bearing 19 or damages to the bearing 19 due to the generation of rust is eliminated.

Moreover, in some cases, the spool 31 extending vertically with respect to the rear bracket 21 is inclined due to the gap between the rear bracket 21 and the second yoke portion 10 to generate a biased stress in the spool 31.

When vibrations or impacts are repeatedly applied to the spool 31 in this state, the rubber bush 101 provided to the projecting portion 312 absorbs the vibrations or impacts. Therefore, an operational instability of the rotor main body of the rotor 2 due to a malfunction of the magnetic circuit, which is caused by the inclination of the spool 31, and the abutment of the cylindrical portion 310 of the spool 31 against the first boss portion 5 of the front pole core 4 and the second boss portion 9 of the rear pole core 8 can be prevented.

Further, even if the water, which has penetrated into the gap between the outer end surface of the second yoke portion 10 and the abutting surface of the regulator, moves to penetrate further inside, the further penetration of the water is inhibited by the rubber bush 101.

Though the rubber bush 101 is provided to the projecting portion 312 of the spool 31 in the above-mentioned first embodiment, a thermoplastic resin (for example, EPDM) may be provided integrally with the projecting portion 312. In this case, a concave-convex portion for increasing fixing strength with the resin may be formed on a surface of the projecting portion 312.

Further, though the coil body 30 is provided on the rear bracket 21 side, the coil body 30 may also be provided on the front bracket 20 side.

In this case, the first yoke portion 6 of the front pole core 4 constitutes the coil body as a component thereof.

Further, though the mounting bolts 100 are used to fix the second yoke portion 10 to the rear bracket 21, the second yoke portion 10 may be fixed to the rear bracket 21 by an adhesive, caulking, or the like.

Further, though the bobbin 32 is used as an insulator, an insulating resin corresponding to an insulator may be applied to the surface of the field coil 13, which is opposed to the second yoke portion 10 and the surfaces of the field coil 13, which are opposed to the spool 31, that is, to the surfaces of the field coil 13 except for a surface of the field coil 13, which is opposed to the claw-like magnetic pole portions 7 and 11. Alternatively, an insulating sheet may be used.

What is claimed is:

1. A brushless alternator, comprising:
   a case including a pair of brackets opposed to each other;
   a shaft provided on a central axis of the case;
   a rotor provided to the shaft; and
   a stator surrounding the rotor, wherein
   the rotor includes:
   a rotor main body fixed to the shaft to rotate with rotation of the shaft; and
   a coil body fixed to one of the pair of brackets,
   the rotor main body includes:
   a first pole core, which is fixed to the shaft, and includes a plurality of first claw-like magnetic pole portions formed at intervals in a circumferential direction; and
   a plurality of second claw-like magnetic pole portions respectively opposed to the plurality of first claw-like magnetic pole portions to mesh therewith, the plurality of second claw-like magnetic pole portions being coupled to the plurality of first claw-like magnetic pole portions neighboring through an intermediation of an annular ring,
   the coil body includes:
   an insulator provided in a space on an inner diameter side of the plurality of first claw-like magnetic pole portions and the plurality of second claw-like magnetic pole portions of a second pole core opposed to the first pole core;
   a field coil constituted by winding a conductor around the insulator, the field coil being for generating a magnetic flux by causing a current to flow therethrough;
   a yoke portion of the second magnetic pole, the yoke portion having one lateral surface being in close contact with a lateral surface of the insulator and another lateral surface being bonded to the one of the pair of brackets to serve as a passage of the magnetic flux;
   a spool provided on an inner circumferential surface of the yoke portion and an inner circumferential surface of the insulator; and
   a buffer member provided to a projecting portion at a distal end of the spool, and
   the buffer member is fitted into a concave portion formed in a portion of the one of the pair of brackets, the portion being opposed to a distal end surface of the spool.

2. A brushless alternator according to claim 1, wherein the buffer member is constituted by a rubber bush.

3. A brushless alternator according to claim 1, wherein the buffer member is constituted by a thermoplastic resin.

4. A brushless alternator according to claim 3, wherein a concave-convex portion is formed on a surface of the projecting portion.

5. A brushless alternator according to claim 1, wherein the buffer member is fitted into the concave portion formed in the one of the pair of brackets on a side opposite to a pulley mounted to a distal end portion of the shaft.

6. A brushless alternator according to claim 1, wherein the insulator is a cylindrical bobbin having flange portions at both ends.

* * * * *